W. E. SHARP.
SWAGING MANDREL FOR FORMING GRIP NUTS.
APPLICATION FILED MAR. 5, 1914.
1,204,500.
Patented Nov. 14, 1916.
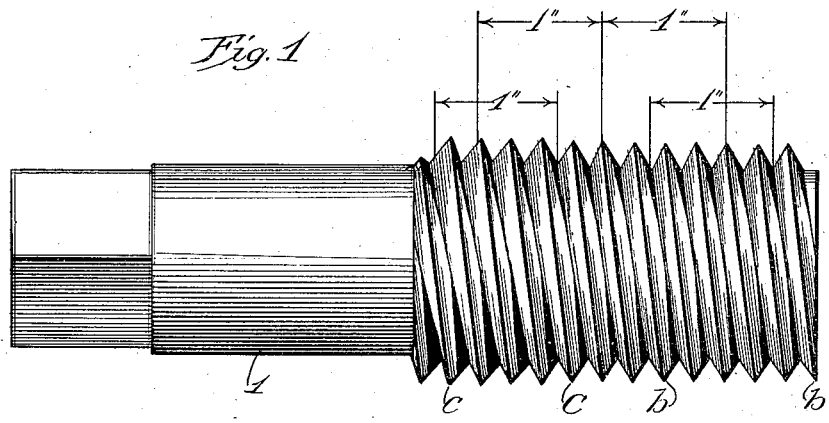
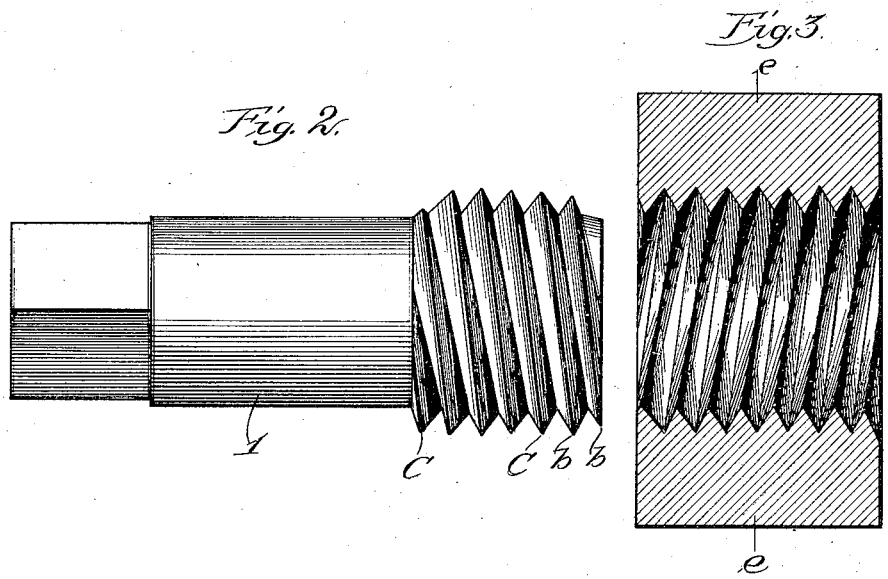
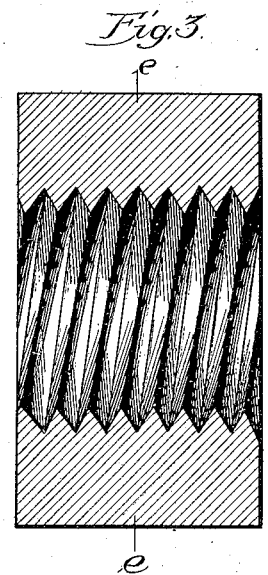
Witnesses:
Inventor:
William E. Sharp
by Stice & Stice
Attys

UNITED STATES PATENT OFFICE.

WILLIAM E. SHARP, OF CHICAGO, ILLINOIS, ASSIGNOR TO GRIP NUT COMPANY, OF CHICAGO, ILLINOIS, A CORPORATION OF ILLINOIS.

SWAGING-MANDREL FOR FORMING GRIP-NUTS.

1,204,500.     Specification of Letters Patent.     Patented Nov. 14, 1916.

Original application filed November 8, 1913, Serial No. 799,868. Divided and this application filed March 5, 1914. Serial No. 822,591.

*To all whom it may concern:*

Be it known that I, WILLIAM E. SHARP, a citizen of the United States, residing at Chicago, in the county of Cook and State of Illinois, have invented certain new and useful Improvements in Swaging-Mandrels for Forming Grip-Nuts, of which the following is a description.

This application is a division of an application heretofore filed by me on November 8, 1913, Serial No. 799,868.

My improved mandrel is particularly adapted for the production of what is generally termed "grip nuts," in which a bolt nut is so formed as to engage the bolt in a manner which tends to prevent the accidental disengagement of the nut from the bolt, as by backing off, caused by shocks or jarring of the parts.

To this end my invention consists in the novel swaging mandrel more fully described herein, and particularly pointed out in the claims.

In the drawings, wherein like reference characters indicate like or corresponding parts, Figure 1 is a side elevation of one form of my improved swaging mandrel; Fig. 2 is a slight modification of the form shown in Fig. 1; and Fig. 3 is a transverse section through a nut formed with the aid of said mandrel.

The parts are exaggerated as shown in the drawings, in order to more clearly illustrate the constructions.

As shown in the drawings, 1 is a mandrel suitably hardened and tempered to accomplish the purpose for which it is constructed. As shown in said figures, the advancing end of the mandrel, as at $b$—$b$, is preferably formed with a standard thread, which will loosely engage with the regular threaded nut, with which it is adapted to coöperate. This is provided as a lead for the coöperating part of the mandrel until the latter is suitably and firmly engaged with the nut to secure the proper swaging action. The lead or advancing end is of such dimensions as to permit the necessary backing out of the swage without affecting the slightly modified form of the swaged threads of the nut. The following or swaging part or section of the mandrel as at $c$—$c$, is gradually modified as to the thread so as to swage the thread on the nut, part way through the same, into a form which may be termed abnormal, meaning a slight modification of the form or pitch of the thread in the nut causing said modified part to frictionally engage with the coöperating thread on the bolt at that point. This modification needs to be but slight to secure the operation described, causing the nut to bind. A nut so formed will readily thread on its coöperating bolt with what may be termed a finger fit, but upon reaching the modified section, suitable tools and considerable force may be required to turn the nut to its proper seat.

In forming the nut, it is obvious that it may be first cut in the usual manner, and then threaded upon the mandrel and forced thereon to the point desired, to secure the proper modification of the binding threads. This binding part may begin at such a point in the nut as desired, and is gaged by the distance the nut is forced upon the swage. As shown in Fig. 3, the modified threads begin substantially midway between the two faces, substantially on the line $e$—$e$. It will be obvious that after the standard thread is cut in the usual manner, no further cutting of the nut is shown, although the form or pitch of the thread, or if preferred, both, may be modified as described to the extent necessary to secure the operation set forth.

As shown in Fig. 2, the mandrel may be made shorter, and the leading section may be reduced to the minimum, the modified swaging threads of the mandrel being so gradual in their lead to the ultimate point of operation that the swage will secure a proper grip on the nut to insure the proper operation. The leading part may also be purposely made to form a loose fit or engagement for the same purpose. It should at all times be so formed that the modification need be but slight, the change from the normal to the abnormal being sufficient to secure the binding effect of the nut upon the bolt.

Where in the claims I have referred to the "form or pitch" of the abnormal threads of the nut, I wish to be understood as meaning any modification of the thread that will secure the said binding effect, caused by the swaging action, and not resulting from any initial cutting or recutting of the nuts.

Having thus described my invention, what I claim as new and desire to secure by Letters Patent is:—

1. A mandrel for use in forming bolt nuts, comprising a swaging mandrel provided with an entering section screw-threaded to substantially conform to the normal thread of the nut, and a following section slightly varying therefrom substantially as and for the purpose set forth.

2. A mandrel for use in forming bolt nuts, comprising a swaging mandrel having its entering section screw-threaded to loosely conform to the normal thread of the nut, and a following section varying therefrom substantially as and for the purpose set forth.

In testimony whereof, I have hereunto signed my name in the presence of two subscribing witnesses.

WILLIAM E. SHARP.

Witnesses:
W. C. COOK,
CHARLES I. COBB.

Copies of this patent may be obtained for five cents each, by addressing the "Commissioner of Patents, Washington, D. C."